March 27, 1962 J. E. WILCOX 3,027,523

APPARATUS FOR PRODUCING A SINGLE SIDEBAND SIGNAL IN A SAMPLING SYSTEM

Filed Aug. 14, 1959

INVENTOR.
JACK "E" WILCOX
BY
Fordyce A. Bothwell
ATTORNEY

United States Patent Office 3,027,523
Patented Mar. 27, 1962

3,027,523

APPARATUS FOR PRODUCING A SINGLE SIDE-BAND SIGNAL IN A SAMPLING SYSTEM

Jack E. Wilcox, Levittown, Pa., assignor, by mesne assignments, to Philco Corporation, Philadelphia, Pa., a corporation of Delaware Filed Aug. 14, 1959, Ser. No. 833,846
1 Claim. (Cl. 332—45)

This invention relates to communication systems of the type wherein the intelligence or information contained in the intelligence signal within a predetermined band of frequencies is sampled at a predetermined frequency, and the pulses thus derived are caused to amplitude modulate a carrier for transmission. More particularly, this invention relates to the production of a single sideband signal in such a system.

One known method of producing a single sideband signal in such a system involves the use of a bandpass filter to select one of the two sidebands which are produced by the modulation process. This method requires a sharp cut-off filter.

Another known method involves phase-splitting of the sampled intelligence signal into two signals having a quadrature phase relation, applying the two signals to two modulators to which quadrature-related carriers are also applied, and adding or subtracting the outputs of the modulators to produce a single sideband signal. In this method one of the sidebands is caused to cancel out by reason of the phase-quadrature relation of the modulating signals and the phase-quadrature relation of the carriers. This method requires a wide band phase-splitting network to split the intelligence signal into two quadrature signals.

One object of the present invention is to provide an improved system of the sampling type for producing a single sideband signal.

Another object of the invention is to provide such a system which does not require either a sharp cut-off filter or a wide band phase-splitting network.

A related object of the invention is to provide such a system which is economical to construct and which can be easily aligned.

In accordance with this invention, there is provided a system comprising first and second samplers, means for supplying an intelligence signal to both samplers, means for supplying to the respective samplers sampling signals having the same frequency components but whose corresponding frequency components have a quadrature phase relation, first and second modulators, means for supplying the output of the first sampler to said first modulator, means for supplying the output of the second sampler to said second modulator, means for supplying to the respective modulators carriers of the same frequency but having a quadrature phase relation, and means for deriving a single sideband signal from the outputs of said modulators.

The invention may be fully understood from the following detailed description with reference to the accompanying drawing wherein.

Figure 1:
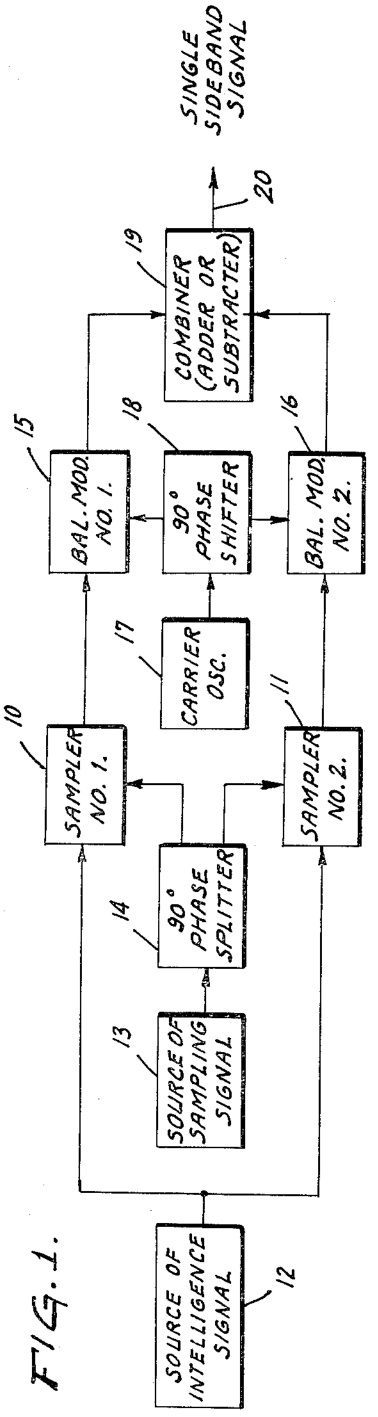
FIG. 1 is a block diagram of a system according to the present invention.

Referring first to FIG. 1, the system illustrated comprises first and second samplers 10 and 11 to which the intelligence signal is supplied from source 12. A sampling signal of predetermined frequency is supplied from source 13 to a 90° phase splitter 14 which supplies to the respective samplers sampling signals having the same frequency components but whose corresponding frequency components have a quadrature phase relation, i.e. their phases differ by 90°. The output of each sampler is a signal at the sampling frequency having sidebands containing the information of the intelligence signal.

The system further comprises first and second modulators 15 and 16 to which are supplied the respective outputs of samplers 10 and 11. There are also supplied to the respective modulators 15 and 16 carriers of the same frequency but having the same quadrature phase relation as the sampling signals. As shown, the carriers may be supplied from a carrier oscillator 17 through a 90° phase shifter 18 which produces the quadrature-related carriers. Preferably balanced modulators are employed to effect cancellation of the carrier in each modulator. The output of each modulator includes double sideband components of the sampling frequency.

The outputs of the modulators are supplied to a combiner 19 which may be either an adder or a subtracter, depending on which sideband it is desired to derive at the output 20. In any case, one sideband of the output of modulator 15 is opposite in phase to the corresponding sideband of the output of modulator 16 and therefore the two cancel out, while the other corresponding sidebands of the outputs of the modulators are of the same phase and add to produce a single sideband signal.

An important advantage of this system is that it does not require any sharp cut-off filter and the phase splitter 14 is not required to effect 90° phase splitting over a continuous spectrum of frequencies. It is only required to effect 90° phase splitting at the sampling frequency and at such harmonics thereof as may be contained in the sampling signal.

The present invention is applicable to any system involving sampling of an intelligence signal. For example, the intelligence signal supplied by source 12 could be a video signal. The sampling signals supplier to the samplers 10 and 11 preferably are substantially of square waveform. The phase splitter 14 may be of the form described below. The samplers 10 and 11 may be conventional gates or modulators, for example each sampler may comprise a multi-grid vacuum tube with the intelligence signal applied to one grid and the sampling signal supplied to another grid, the tube being rendered conductive intermittently by the sampling signal. The modulators 15 and 16 may be conventional balanced modulators. The carrier oscillator 17 may be a conventional sine wave oscillator. The phase shifter 18 may be of the form described below. The combiner 19 may be a conventional adder or substracter.

Figure 2:
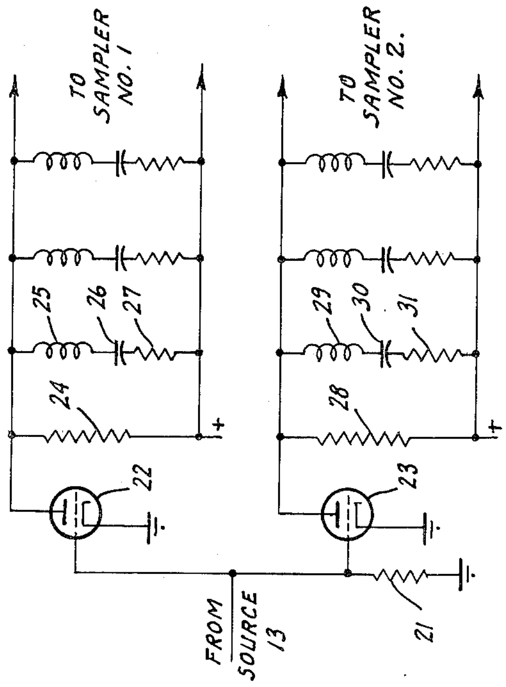
FIG. 2 is a schematic diagram of one form of phase splitter which may be used in the system of FIG. 1.

A suitable form of the 90° phase splitter 14 is shown in FIG. 2, although it is to be understood that any other suitable form may be employed. Referring to FIG. 2, the sampling signal from source 13 appears across resistor 21 and is supplied to the control grids of tubes 22 and 23. The plate of tube 22 is connected to a network comprising resistor 24 and a number of series tuned circuits each including an inductor 25, a capacitor 26 and a resistor 27. The plate of tube 23 is connected to a network comprising a resistor 28 and a number of series tuned circuits each including an inductor 29, a capacitor 30 and a resistor 31. The signals derived from the two networks and supplied to the samplers are the quadrature-related sampling signals.

The number of series tuned circuits in each of the networks depends upon the number of significant harmonics in the sampling signal. In the illustration, three series tuned circuits are shown in each of the networks but this is merely by way of example. Designating the sampling frequency as $f_s$ and the hormonics as $2f_s$, $3f_s$, etc., the first series tuned circuit in each network is resonant between zero and $f_s$, the second is resonant between $f_s$ and $2f_s$, the third is resonant between $2f_s$ and $3f_s$, etc. The output signals have the desired quadrature phase relation not only at $f_s$ but also at the frequencies of the significant harmonics.

Figure 3:
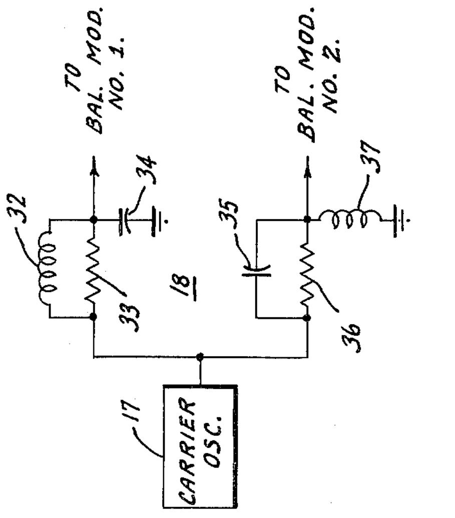
FIG. 3 is a schematic diagram of one form of phase shifter which may be used in the system of FIG. 1.

Referring now to FIG. 3, there is shown by way of example a suitable form of the 90° phase shifter 18. The carrier from the carrier oscillator 17 is supplied to the balanced modulators through phase shifting networks which shift the phase of the carrier 45° in opposite directions, so that the two derived carriers have the desired quadrature phase relation. The upper network comprises a series inductor 32 and resistor 33 in shunt relation and a shunt capacitor 34. The lower network comprises a series capacitor 35 and resistor 36 in shunt relation and a shunt inductor 37. The reactance of inductor 32 is equal to twice the reactance of capacitor 34. The reactance of capacitor 35 is equal to twice the reactance of inductor 37. Resistors 33 and 36 have values such that the opposite phase shifts effected by the two networks are each 45°, so that the output signals have the desired quadrature phase relation.

While a single embodiment of the invention has been illustrated and described, it is to be understood that the invention is not limited thereto but contemplates such modifications and further embodiments as may occur to those skilled in the art.

I claim:

In a system for single sideband transmission of intelligence, a source of intelligence signal, first and second samplers, means for supplying the signal from said source to said samplers, means for supplying to the respective samplers sampling signals having the same frequency components but whose corresponding frequency components have a quadrature phase relation, whereby there appears in the output of each sampler a signal at the sampling frequency having upper and lower sidebands containing the information of the intelligence signal, first and second modulators, means for supplying the double sideband output signals from said samplers respectively to said modulators, means for supplying to the respective modulators carriers of the same frequency but having a quadrature phase relation, whereby there appear in the output of each modulator upper and lower sidebands each corresponding to the double sideband signal received from the associated sampler, and means for combining the outputs of the modulators so as to eliminate one of the sidebands of the output of each modulator and to produce a single sideband signal representative of the sampling frequency and upper and lower sidebands containing the information of the intelligence signal.

References Cited in the file of this patent

UNITED STATES PATENTS

| | | |
|---|---|---|
| 1,719,052 | Green | July 2, 1929 |
| 2,661,458 | Saraga | Dec. 1, 1953 |